United States Patent
Bai et al.

(10) Patent No.: US 11,589,343 B2
(45) Date of Patent: Feb. 21, 2023

(54) FAST BEAM UPDATE IN A GROUP OF COMPONENT CARRIERS VIA DOWNLINK CONTROL INFORMATION

(71) Applicant: QUALCOMM Incorporated, San Diego, CA (US)

(72) Inventors: Tianyang Bai, Somerville, NJ (US); Yan Zhou, San Diego, CA (US); Tao Luo, San Diego, CA (US); Kiran Venugopal, Raritan, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 34 days.

(21) Appl. No.: 17/119,739

(22) Filed: Dec. 11, 2020

(65) Prior Publication Data

US 2021/0185648 A1 Jun. 17, 2021

Related U.S. Application Data

(60) Provisional application No. 62/948,776, filed on Dec. 16, 2019.

(51) Int. Cl.
*H04W 72/04* (2009.01)
*H04L 5/00* (2006.01)
*H04W 72/0453* (2023.01)

(52) U.S. Cl.
CPC ......... *H04W 72/042* (2013.01); *H04L 5/0048* (2013.01); *H04W 72/0453* (2013.01)

(58) Field of Classification Search
CPC .............................. H04W 72/042; H04L 5/0048
See application file for complete search history.

(56) References Cited

U.S. PATENT DOCUMENTS

2012/0307821 A1* 12/2012 Kwon ............... H04W 56/0045
2019/0356431 A1* 11/2019 Manolako ............ H04B 7/0639
2021/0273699 A1* 9/2021 Cao ....................... H04L 5/0094

FOREIGN PATENT DOCUMENTS

CN   WO 2021087828    * 5/2021    ............ H04W 72/04
WO   WO-2019223634 A1   11/2019

OTHER PUBLICATIONS

Huawei, et al., "Enhancements on Multi-Beam Operation", 3GPP Draft, 3GPP TSG RAN WG1 Meeting #98, R1-1908067, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 26, 2019-Aug. 30, 2019, Aug. 17, 2019 (Aug. 17, 2019), XP051764690, 20 Pages, Retrieved from the Internet: URL:http://www.3gpp.org/ftp/tsg_ran/WG1_RL1/TSGR1_98/Docs/R1-1908067.zip [retrieved on Aug. 17, 2019] The Whole Document, Paragraph [02.4], p. 4-p. 6, Table 1.

(Continued)

*Primary Examiner* — Ronald B Abelson
(74) *Attorney, Agent, or Firm* — Qualcomm Incorporated

(57) ABSTRACT

Certain aspects of the present disclosure relate to methods and apparatus for updating beam information across a plurality of component carriers (CCs) via downlink control information (DCI). An exemplary method, performed by a user equipment (UE), generally includes receiving, from a network entity, a downlink control information (DCI) for an update for at least of a beam or path loss (PL) reference signal (RS) activation and applying the update across at least one of a group of component carriers (CCs) or bandwidth parts (BWPs) within the group of CCs.

36 Claims, 11 Drawing Sheets

(56) References Cited

OTHER PUBLICATIONS

International Search Report and Written Opinion—PCT/US2020/064725—ISA/EPO—dated Mar. 22, 2021.
NTT DOCOMO, INC: "Discussion on Multi-Beam Enhancement", 3GPP Draft, 3GPP TSG RAN WG1 #98bis, R1-1911185, 3rd Generation Partnership Project (3GPP), Mobile Competence Centre, 650, Route Des Lucioles, F-06921, Sophia-Antipolis Cedex, France, vol. RAN WG1, No. Chongqing, China, Oct. 14, 2019-Oct. 20, 2019, Oct. 4, 2019 (Oct. 4, 2019), XP051789957, pp. 1-20, Retrieved from the Internet: URL:http://www.3gpp.org/ftp/tsg_ran/WG1_RL1/TSGR1_98b/Docs/R1-1911185.zip R1-1911185.docx [retrieved on Oct. 4, 2019] Section 3.3, Paragraph [03.3].

* cited by examiner

```
TCI-State ::=           SEQUENCE {
    tci - StateId           TCI - StateId,
    qcl-Type1               QCL-Info,
    qcl-Type2               QCL-Info                            OPTIONAL, --
Need R
    nrofPTRS - Ports        ENUMERATED {n1, n2}
    OPTIONAL, -- Need R
    ...
}

QCL - Info ::=          SEQUENCE {
    cell                    ServCellIndex                       OPTIONAL, --
Need R
    bwp-Id                  BWP-Id                              OPTIONAL, --
Cond CSI-RS-Indicated
    referenceSignal         CHOICE {
        csi-rs                  NZP-CSI-RS-ResourceId,
        ssb                     SSB-Index,
        csi-RS-for-tracking     NZP-CSI-RS-ResourceSetId
    },
    qcl - Type              ENUMERATED {typeA, typeB, typeC, typeD},
```

FIG. 4

FAST BEAM UPDATE IN A GROUP OF COMPONENT CARRIERS VIA DOWNLINK CONTROL INFORMATION

CROSS-REFERENCE TO RELATED APPLICATIONS

This application claims benefit of and priority to U.S. Provisional Application No. 62/948,776, filed Dec. 16, 2019, which is hereby assigned to the assignee hereof and hereby expressly incorporated by reference herein in its entirety as if fully set forth below and for all applicable purposes.

FIELD

The present disclosure relates generally to communication systems, and more particularly, to methods and apparatus for updating beam information across a plurality of component carriers (CCs) via downlink control information (DCI).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, Next Generation Node B (gNB), etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications by a user equipment. The method generally includes receiving, from a network entity, a downlink control information (DCI) for an update for at least of a beam or path loss (PL) reference signal (RS) activation and applying the update across at least one of a group of component carriers (CCs) or bandwidth parts (BWPs) within the group of CCs.

Certain aspects provide an apparatus for wireless communications by a user equipment. The apparatus generally includes at least one processor configured to receive, from a network entity, a downlink control information (DCI) for an update for at least of a beam or path loss (PL) reference signal (RS) activation and apply the update across at least one of a group of component carriers (CCs) or bandwidth parts (BWPs) within the group of CCs. In some cases, the apparatus may also include a memory coupled with the at least one processor.

Certain aspects provide an apparatus for wireless communications by a user equipment. The apparatus generally includes means for receiving, from a network entity, a downlink control information (DCI) for an update for at least of a beam or path loss (PL) reference signal (RS) activation and means for applying the update across at least one of a group of component carriers (CCs) or bandwidth parts (BWPs) within the group of CCs.

Certain aspects provide a non-transitory computer-readable medium for wireless communications by a user equipment. The non-transitory computer-readable medium generally includes instructions that, when executed by at least one processor, cause the at least one processor to receive, from a network entity, a downlink control information (DCI) for an update for at least of a beam or path loss (PL) reference signal (RS) activation and apply the update across at least one of a group of component carriers (CCs) or bandwidth parts (BWPs) within the group of CCs.

Certain aspects provide a method for wireless communications by a network entity. The method generally includes transmitting, to a user equipment (UE), a downlink control information (DCI) for an update for at least of a beam or path loss (PL) reference signal (RS) activation and processing transmissions from the UE, based on the UE applying the update across at least one of a group of component carriers (CCs) or bandwidth parts (BWPs) within the group of CCs.

Certain aspects provide an apparatus for wireless communications by a network entity. The apparatus generally includes at least one processor configured to transmit, to a user equipment (UE), a downlink control information (DCI) for an update for at least of a beam or path loss (PL) reference signal (RS) activation and process transmissions from the UE, based on the UE applying the update across at least one of a group of component carriers (CCs) or bandwidth parts (BWPs) within the group of CCs. In some cases, the apparatus may also include a memory coupled with the at least one processor.

Certain aspects provide an apparatus for wireless communications by a network entity. The apparatus generally includes means for transmitting, to a user equipment (UE), a downlink control information (DCI) for an update for at least of a beam or path loss (PL) reference signal (RS) activation and means for processing transmissions from the UE, based on the UE applying the update across at least one of a group of component carriers (CCs) or bandwidth parts (BWPs) within the group of CCs.

Certain aspects provide a non-transitory computer-readable medium for wireless communications by a network entity. The non-transitory computer-readable medium generally includes instructions that, when executed by at least one processor, cause the at least one processor to transmit, to a user equipment (UE), a downlink control information (DCI) for an update for at least of a beam or path loss (PL) reference signal (RS) activation and process transmissions from the UE, based on the UE applying the update across at least one of a group of component carriers (CCs) or bandwidth parts (BWPs) within the group of CCs.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 4 illustrates an example of transmission configuration indicator (TCI) state information used to signal quasi-colocation (QCL) information.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
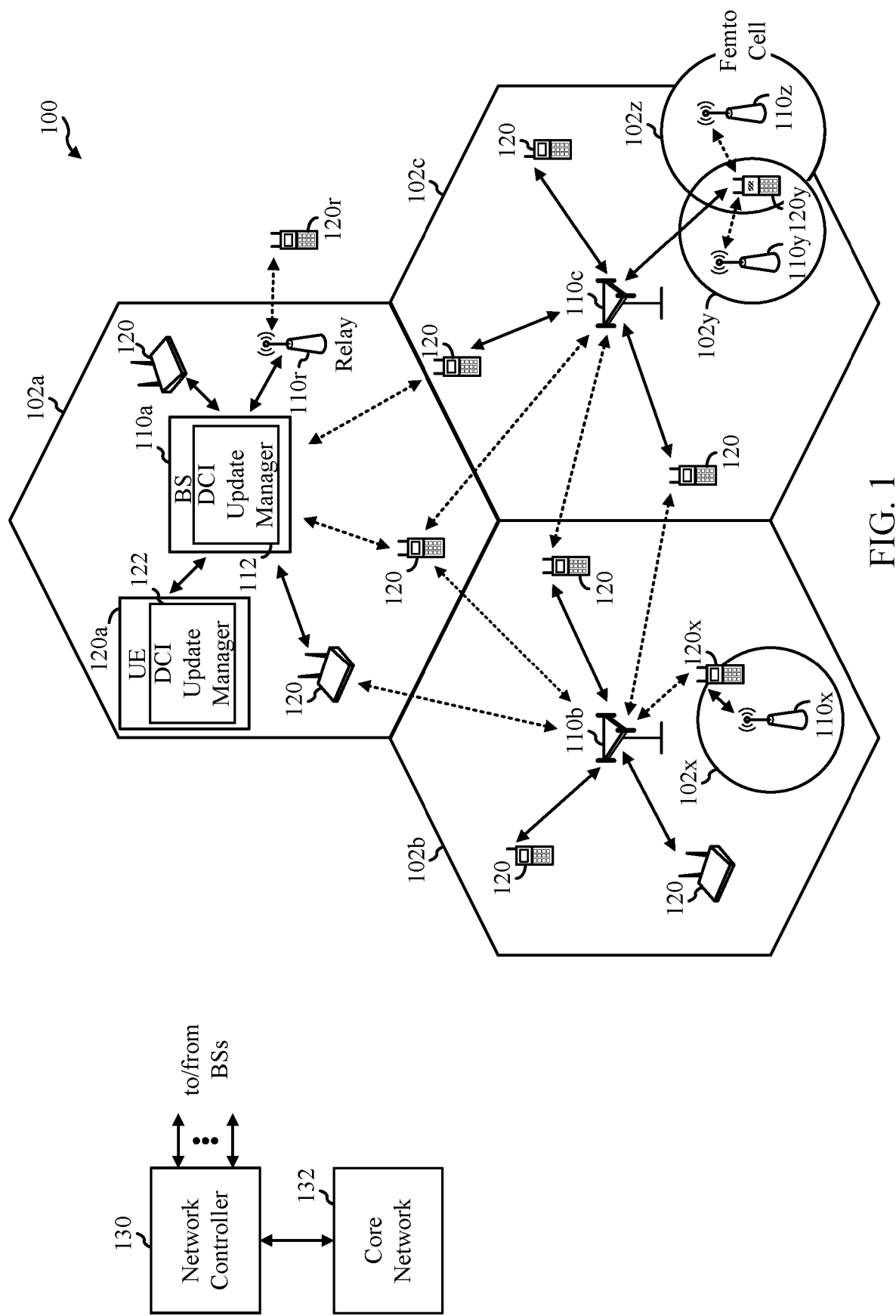
FIG. 1 is a block diagram conceptually illustrating an example telecommunications system, in which aspects of the present disclosure may be performed.

Aspects of the present disclosure provide mechanisms for updating beam information and/or path loss (PL) reference signal (RS) activation across a plurality of component carriers (CCs) via downlink control information (DCI). In some cases, the mechanisms may be applied in wireless communication systems, such as a 5G new radio (NR) wireless communication system. In some cases, the DCI may indicate the update via a transmission configuration information (TCI) state activation command. In other cases, the DCI may indicate the update via a PL RS activation command. In some cases, the update may be applied across at least one of a group of CCs or bandwidth parts (BWPs) within the group of CCs.

The following description provides examples of updating beam information across a plurality of CCs via DCI in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110a-z (each also individually referred to herein as BS 110 or collectively as BSs 110) and/or user equipment (UE) 120a-y (each also individually referred to herein as UE 120 or collectively as UEs 120) in the wireless communication network 100 via one or more interfaces.

According to certain aspects, the BSs 110 and UEs 120 may be configured for updating beam information across a plurality of component carriers (CCs) via downlink control information (DCI). As shown in FIG. 1, the BS 110a includes a DCI update manager 112 that may be configured to perform the operations illustrated in FIG. 9, as well as other operations described herein for efficiently signaling a common update for a UE to apply across multiple CCs. Additionally, the UE 120a includes a DCI update manager 122 that may be configured to perform the operations illustrated in FIG. 8, as well as other operations described herein for applying a common beam update across multiple CCs.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple cells.

The BSs 110 communicate with UEs 120 in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
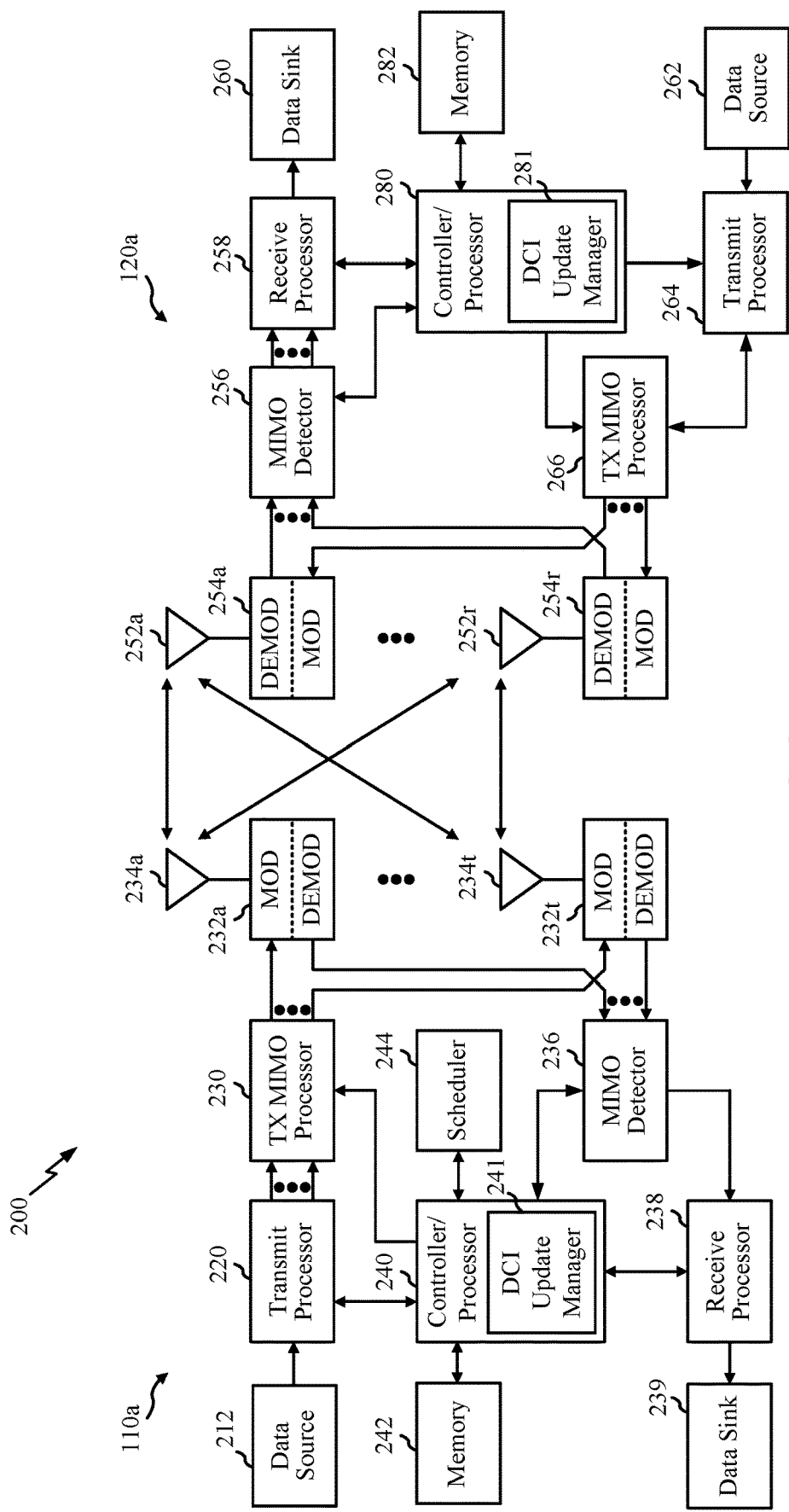
FIG. 2 is a block diagram conceptually illustrating a design of an example B S and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the demodulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a includes a downlink control information (DCI) update manager 241 that may be configured to perform the operations illustrated in FIG. 9, as well as other operations described herein for efficiently signaling a common update for a UE to apply across multiple CCs. Additionally, as shown in FIG. 2, the controller/processor 280 of the UE 120a includes a DCI update manager 281 that may be configured to perform the operations illustrated in FIG. 8, as well as other operations described herein for applying a common beam update across multiple CCs. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
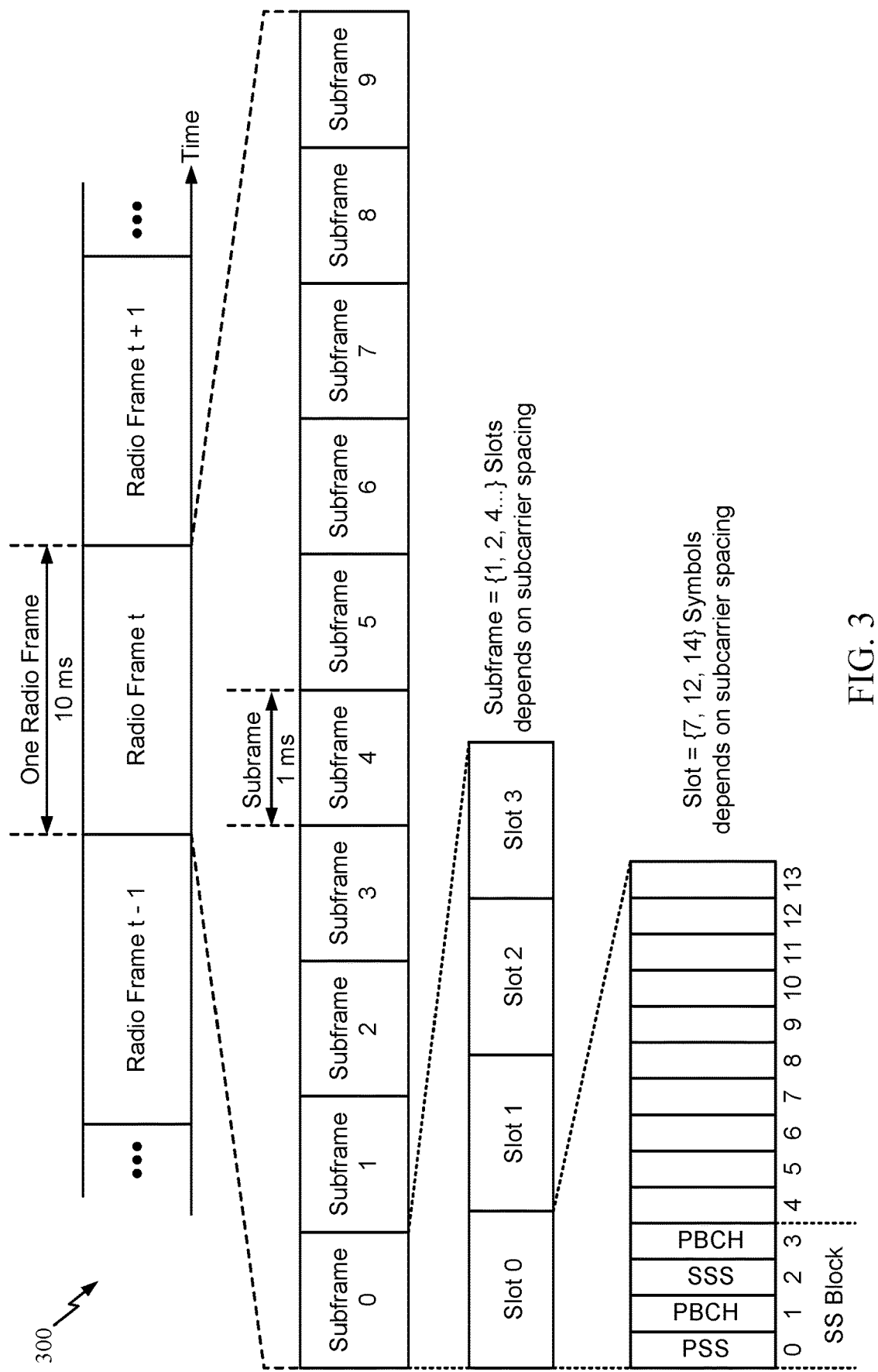
FIG. 3 illustrates an example of a frame format for a new radio (NR) system, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A sub-slot structure may refer to a transmit time interval having a duration less than a slot (e.g., 2, 3, or 4 symbols). Each symbol in a slot may be configured for a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

Example QCL Signaling

In many cases, it is important for a UE, such as the UE 120a, to know which assumptions it can make on a channel corresponding to different transmissions. For example, the UE may need to know which reference signals it can use to estimate the channel in order to decode a transmitted signal (e.g., PDCCH or PDSCH). It may also be important for the UE to be able to report relevant channel state information (CSI) to the BS/gNB (e.g., BS 110*a*) for scheduling, link adaptation, and/or beam management purposes. In NR, the concept of quasi co-location (QCL) and transmission configuration indicator (TCI) states is used to convey information about these assumptions.

QCL assumptions are generally defined in terms of channel properties. Per 3GPP TS 38.214, "two antenna ports are said to be quasi-co-located if properties of the channel over which a symbol on one antenna port is conveyed can be inferred from the channel over which a symbol on the other antenna port is conveyed." Different reference signals may be considered quasi co-located ("QCL'd") if a receiver (e.g., a UE) can apply channel properties determined by detecting a first reference signal to help detect a second reference signal. TCI states generally include configurations such as QCL-relationships, for example, between the DL RSs in one CSI-RS set and the PDSCH DMRS ports.

In some cases, a UE may be configured with up to M TCI-States. Configuration of the M TCI-States can come about via higher layer signaling, while a UE may be signalled to decode PDSCH according to a detected PDCCH with DCI indicating one of the TCI states. For example, a particular TCI state may be indicated by an N bit DCI field for a PDSCH. Each configured TCI state may include one RS set TCI-RS-SetConfig that indicates different QCL assumptions between certain source and target signals.

In certain deployments, techniques are used to provide quasi-colocation (QCL) signaling for reference signals (RS) and channels across scenarios involving multiple cells, such as coordinated multipoint (CoMP) scenarios in which multiple transmit receive points (TRPs) or integrated access and backhaul (IAB) nodes each have their own cell ID.

FIG. 4 illustrates an example of how RSs associated with TCI states may be configured via radio resource control (RRC) signaling. QCL information and/or types may in some scenarios depend on or be a function of other information. For example, the quasi co-location (QCL) types indicated to the UE can be based on higher layer parameter QCL-Type and may take one or a combination of the following types:

QCL-TypeA: {Doppler shift, Doppler spread, average delay, delay spread},

QCL-TypeB: {Doppler shift, Doppler spread},

QCL-TypeC: {average delay, Doppler shift}, and

QCL-TypeD: {Spatial Rx parameter},

Spatial QCL assumptions (QCL-TypeD) may be used to help a UE to select an analog Rx beam (e.g., during beam management procedures). For example, an SSB resource indicator may indicate a same beam for a previous reference signal should be used for a subsequent transmission.

As illustrated in FIG. 4, the TCI states may indicate which RS are QCL'd and the QCL type. The TCI state may also indicate a ServCellIndex that is a short identity, used to identify a serving cell, such as a primary cell (PCell) or a secondary cell (Scell) in a carrier aggregation (CA) deployment. Value 0 for this field may indicate the PCell, while the SCellIndex that has previously been assigned may apply for SCells.

Figure 5:
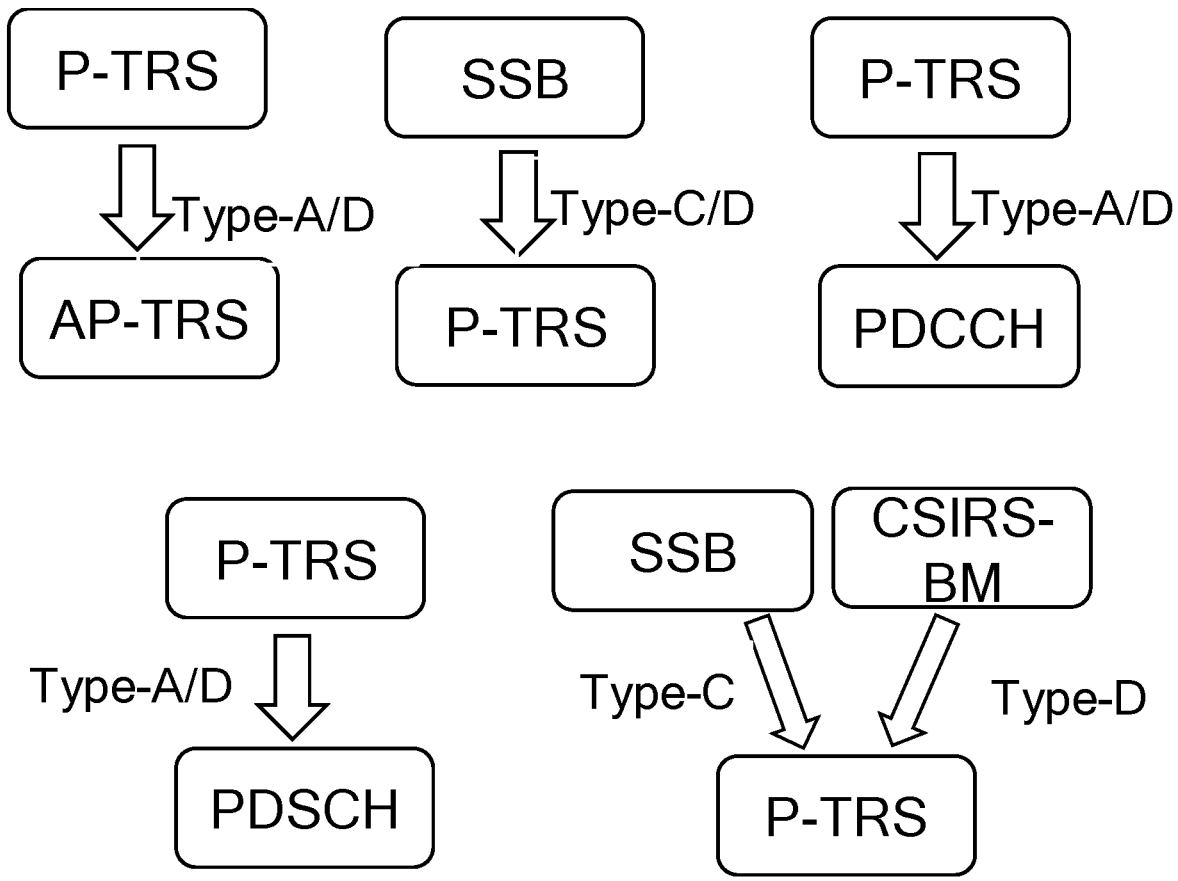
FIG. 5 graphically illustrates example QCL relationships between source and target reference signals.

FIG. 5 illustrate examples of the association of DL reference signals with corresponding QCL types that may be indicated by a TCI-RS-SetConfig.

In the examples of FIG. 5, a source reference signal (RS) is indicated in the top block and is associated with a target signal indicated in the bottom block. In this context, a target signal generally refers to a signal for which channel properties may be inferred by measuring those channel properties for an associated source signal. As noted above, a UE may use the source RS to determine various channel parameters, depending on the associated QCL type, and use those various channel properties (determined based on the source RS) to process the target signal. A target RS does not necessarily need to be PDSCH's DMRS, rather it can be any other RS: PUSCH DMRS, CSIRS, TRS, and SRS.

As illustrated, each TCI-RS-SetConfig contains parameters. These parameters can, for example, configure quasi co-location relationship(s) between reference signals in the RS set and the DM-RS port group of the PDSCH. The RS set contains a reference to either one or two DL RSs and an associated quasi co-location type (QCL-Type) for each one configured by the higher layer parameter QCL-Type.

As illustrated in FIG. 5, for the case of two DL RSs, the QCL types can take on a variety of arrangements. For example, QCL types may not be the same, regardless of whether the references are to the same DL RS or different DL RSs. In the illustrated example, SSB is associated with Type C QCL for P-TRS, while CSI-RS for beam management (CSIRS-BM) is associated with Type D QCL.

Figure 6:
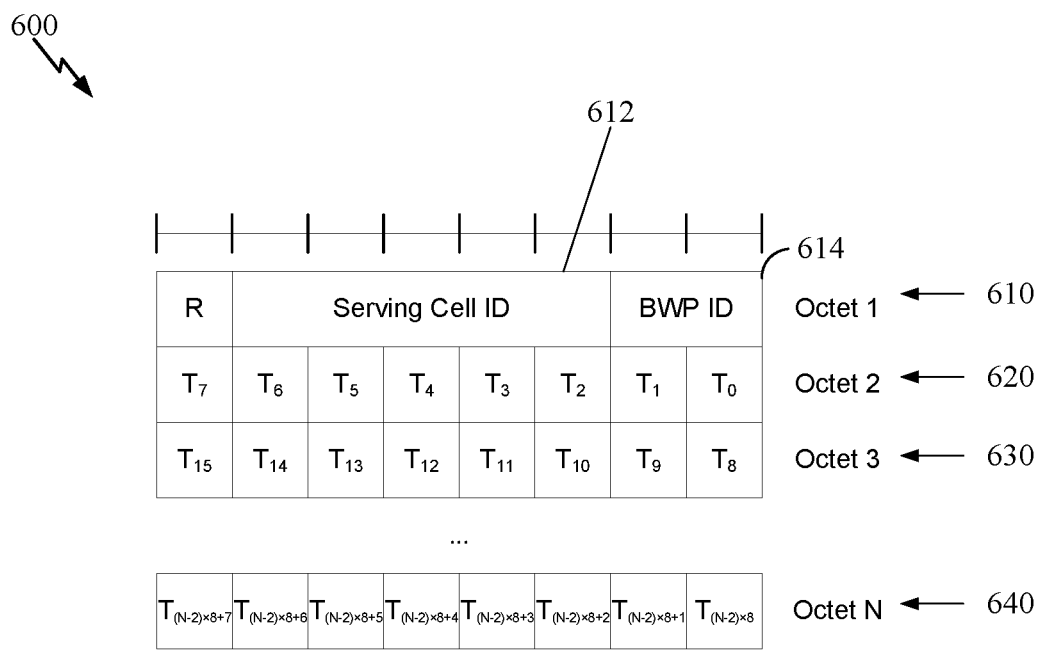
FIG. 6 illustrates an exemplary medium access control (MAC) control element (CE) for activating or deactivating TCI-states for a UE-specific physical channel.

FIG. 6 illustrates an exemplary medium access control (MAC) control element (CE) 600 for activating or deactivating TCI-states for a UE-specific physical downlink shared channel (PDSCH), according to previously known techniques (e.g., Rel-15). The exemplary MAC CE includes a plurality of octets 610, 620, 630, 640, etc. The first octet 610 includes a Serving Cell ID field 612, which is five bits long and indicates the identity of the serving cell for which the MAC CE applies. The first octet also includes a BWP ID field 614 that is two bits long and indicates a downlink (DL) bandwidth part (BWP) for which the MAC CE applies as the code point of the downlink control information (DCI) bandwidth part indicator field as specified in TS 38.212 (available from the 3GPP web site and other sources). The second octet 620 and later octets include bits indicating TCI states for the serving cell ID and BWP ID. For each $T_i$, if there is a TCI state with TCI-StateId i as specified in TS 38.331 (also available from 3GPP), then the corresponding $T_i$ field indicates the activation or deactivation status of the TCI state with TCI-StateId i, otherwise (i.e., there is not a TCI state with TCI-StateID i) the MAC entity ignores the $T_i$ field. The $T_i$ field is set to 1 to indicate that the TCI state with TCI-StateIdi is activated and mapped to the code point of the DCI Transmission Configuration Indication field, as specified in TS 38.214 (available from 3GPP). The $T_i$ field is set to 0 to indicate that the TCI state with TCI-StateId i is deactivated and is not mapped to the code point of the DCI Transmission Configuration Indication field. The code point to which the TCI State is mapped is determined by its ordinal position among all the TCI States with $T_i$ field set to 1, i.e. the first TCI State with $T_i$ field set to 1 shall be mapped to the code point value 0, second TCI State with $T_i$ field set to 1 shall be mapped to the code point value 1, and so on. The maximum number of activated TCI states may be 8.

Figure 7:
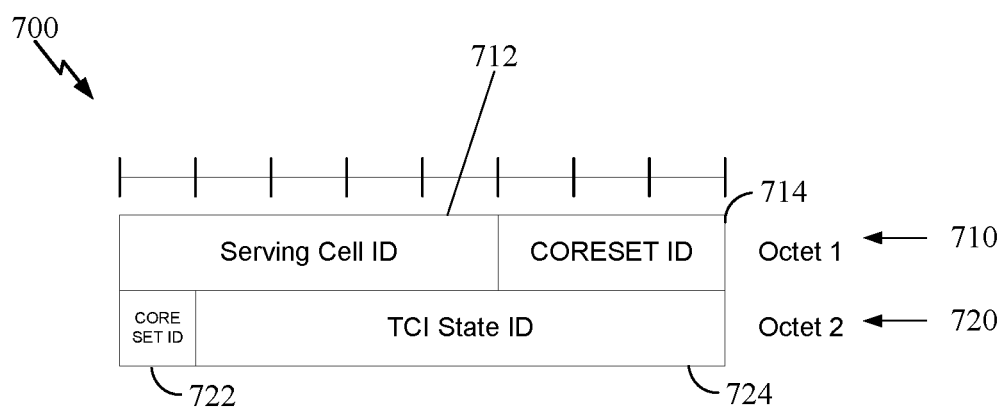
FIG. 7 illustrates an exemplary MAC CE for activating or deactivating a TCI-state for a PDCCH.

FIG. 7 illustrates an exemplary MAC CE 700 for activating or deactivating a TCI-state for a PDCCH, according to previously known techniques (e.g., Rel-15). The first octet 710 includes a Serving Cell ID field 712 that is five bits long and indicates the identity of the serving cell for which the MAC CE applies. The last three bits 714 and the first bit 722 of the second octet 720 make up a control resource set (CORESET) ID field, which is four bits long and indicates a CORESET identified with ControlResourceSetId (e.g., as specified in TS 38.331, available from 3GPP), for which the TCI State is being indicated. If the value of the field is 0, then the field refers to the control resource set configured by controlResourceSetZero (e.g., as specified in TS 38.331). The second octet 720 includes a TCI State ID field which is seven bits long and indicates the TCI state identified by TCI-StateId (e.g., as specified in TS 38.331) applicable to the control resource set identified by the CORESET ID field. If the value of the CORESET ID field is set to 0, then the TCI State ID field indicates a TCI-StateId for a TCI state of the first 64 TCI-states configured by tci-States-ToAddModList and tci-States-ToReleaseList in the PDSCH-Config in the active BWP. If the value of the CORESET ID field is set to a value other than 0, then the TCI State ID field indicates a TCI-StateId configured by tci-StatesPDCCH-ToAddList and tci-StatesPDCCH-ToReleaseList in the controlResourceSet identified by the indicated CORESET ID.

Example Fast Beam Update in a Group of CCs Via DCI

Aspects of the present disclosure relate to techniques for updating beam information across a plurality of component carriers (CCs) via downlink control information (DCI). The techniques presented herein may help reduce signaling overhead and/or latency by signaling (e.g., via DCI) a common beam update for a UE to apply across multiple CCs (and/or bandwidth parts/BWPs thereof).

Signaling the common update (e.g., of a beam and/or path loss reference signal activation) for multiple CCs via DCI, as proposed herein, may reduce latency as compared to signaling information of a similar type via other signaling mechanisms. For example, signaling a beam update (e.g., for a physical downlink control channel (PDCCH), a physical downlink shared channel (PDSCH), or sounding reference signals (SRSs)) via a media access control element (MAC-CE) command may typically introduce a 3 ms activation latency for the UE to apply a beam activation command, which is undesirable.

Figure 8:
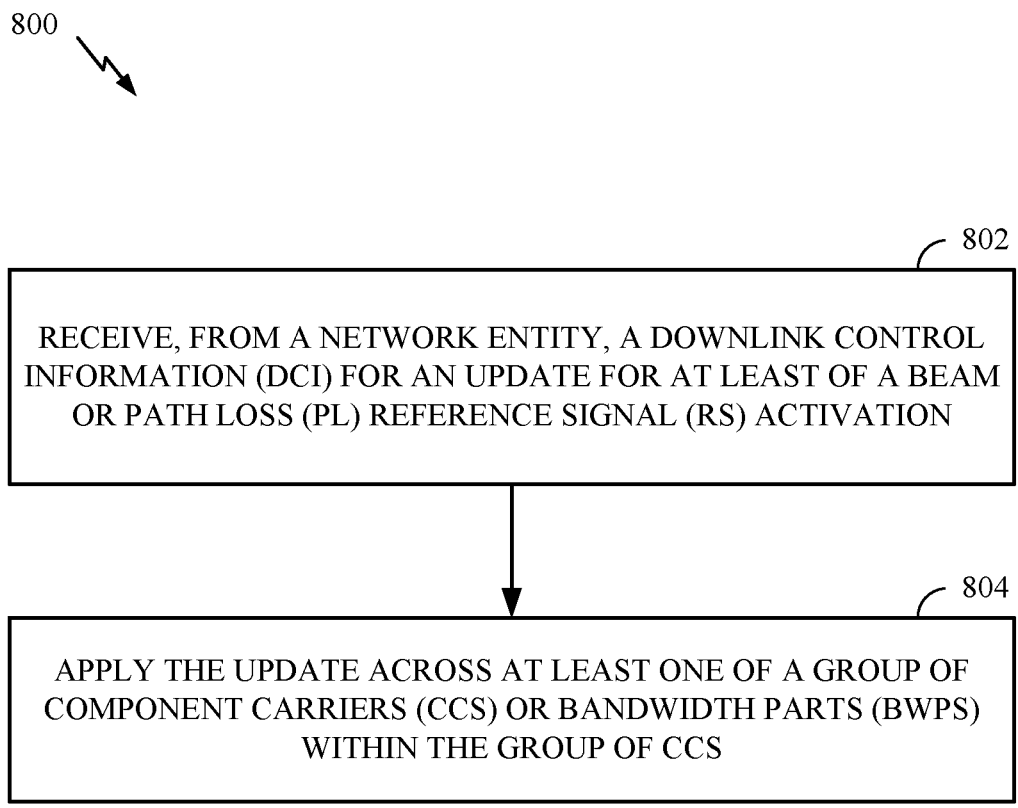
FIG. 8 illustrates example operations for wireless communications by a user equipment (UE), in accordance with aspects of the present disclosure.

FIG. 8 is a flow diagram illustrating example operations 800 for wireless communication, in accordance with certain aspects of the present disclosure. The operations 800 may be performed, for example, by a UE (e.g., such as the UE 120a in the wireless communication network 100) for applying a common beam update across multiple CCs. The operations 800 may be implemented as software components that are executed and run on one or more processors (e.g., controller/processor 280 of FIG. 2). Further, the transmission and reception of signals by the UE in operations 800 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 800 begin, at 802, by receiving, from a network entity, a downlink control information (DCI) for an update for at least of a beam or path loss (PL) reference signal (RS) activation.

At 804, the UE applies the update across at least one of a group of component carriers (CCs) or bandwidth parts (BWPs) within the group of CCs. Thereafter, in some cases, the UE may perform one or more transmissions to the network entity based, at least in part, on the update applied update across at least one of the group of CCs or BWPs within the group of CCs.

Figure 9:
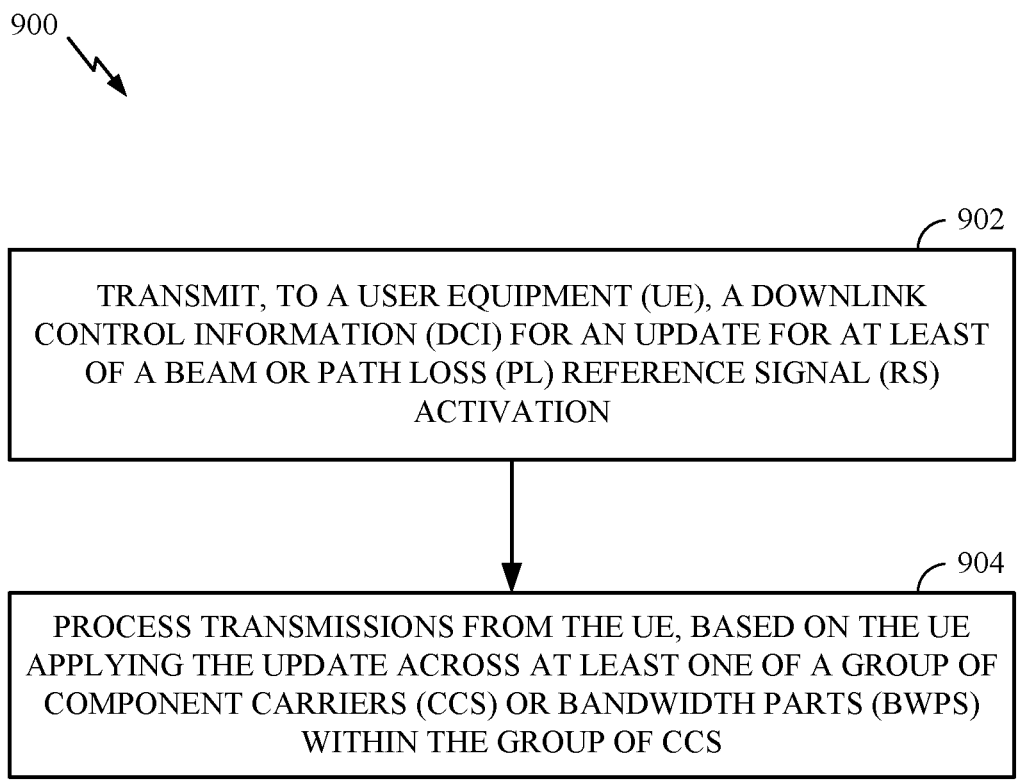
FIG. 9 illustrates example operations for wireless communications by a network entity, in accordance with aspects of the present disclosure.

FIG. 9 is a flow diagram illustrating example operations 900 for wireless communication, in accordance with certain aspects of the present disclosure. The operations 900 may be performed, for example, by a BS (e.g., such as the BS 110a in the wireless communication network 100) for efficiently signaling a common update for a UE to apply across multiple CCs (e.g., to a UE performing operations 800 of FIG. 8). The operations 900 may be complementary to the operations 800 performed by the UE. The operations 900 may be implemented as software components that are executed and run on one or more processors (e.g., controller/processor 240 of FIG. 2). Further, the transmission and reception of signals by the BS in operations 900 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

Operations 900 begin, at 902, by transmitting, to a user equipment (UE), a downlink control information (DCI) for an update for at least of a beam or path loss (PL) reference signal (RS) activation.

At 904, the network entity processes transmissions from the UE, based on the UE applying the update across at least one of a group of component carriers (CCs) or bandwidth parts (BWPs) within the group of CCs.

As noted above, operations 800 and 900 may help reduce overhead and/or latency by effectively utilizing DCI to signal common beam operations (e.g., to update beam information) across multiple CCs and/or BWPs therein. In some cases, this DCI-based signaling mechanism may be applied to a variety of different types of updates.

For example, in some cases, the signaling mechanism may enable a DCI-based downlink beam update across a plurality of CCs in a CC group.

In some cases, a UE may be configured by the network entity with one or more (e.g., up to X) lists of CCs, for example, via RRC signaling (e.g., on a per UE basis). In some cases, the DCI may indicate which list the update is to be applied across. In other cases, the UE may apply the update to all CCs in a list that includes the CC on which the DCI is received. For this purpose, a UE may expect that the CCs in the one or more (e.g., RRC-configured) lists of CCs do not overlap. In some cases, the CC lists for different purposes can be independently configured by the network entity and may include different CCs. For example, CC lists for uplink transmission configuration information (TCI) state activation across multiple CCs or BWPs, downlink TCI state activation across multiple CCs or BWPs, and/or spatial information activation across multiple CCs or BWPs can be independently configured by the network entity.

In some cases, the signaling mechanism may enable a DCI-based update for a PDSCH TCI state activation command to be applied across a CC group. For example, as noted above, in some cases, the UE may receive a DCI for a beam update. In some cases, the DCI indicates the update via a TCI state activation command for the PDSCH, which may include a set of TCI-state IDs for PDSCH that are to be activated by the UE for a set of CCs/BWPs (at least for the same band). In response to the TCI state activation command, the UE may activate/apply the same set of TCI state IDs for all the BWPs in the indicated CCs. In other words, the UE may activate/apply the same set of TCI state IDs for the PDSCH for BWPs in the set of CCs. In some cases, the set of CCs may be indicated via radio resource control (RRC) signaling received by the UE. In some cases, the UE may determine which list of CCs to apply the TCI state activation command across based on an indication in the DCI or based on a CC in which the DCI is received.

In some cases, the signaling mechanism may enable a DCI based update for a PDCCH TCI state activation command to be applied across a CC group. For example, in this case, the DCI received by the UE may indicate the update via a TCI state activation command for the PDCCH. In some cases, the TCI state activation command may indicate a TCI-state ID that is to be activated for a CORESET for a set of CCs/BWPs (at least for the same band). In response to the TCI state activation command, the UE may activate/apply the TCI-state ID for the CORESET(s) with the same CORESET ID for all the BWPs in the indicated CCs. In other words, the UE may activate/apply a same set of one or more TCI state IDs for at least one CORESET that the UE monitors for PDCCH, based on the TCI state activation command, for BWPs in a set of CCs. In some cases, the set of CCs may be indicated via RRC signaling received by the UE. In some cases, the UE may determine which list of CCs to apply the TCI state activation command across based on an indication in the DCI or based on a CC in which the DCI is received.

In some cases, the signaling mechanism may enable a DCI based update for a CSI-RS TCI state activation command to be applied across a CC group. For example, in this case, the DCI received by the UE may indicate the update via a TCI state activation command for CSI-RS. In some cases, the TCI state activation command may indicate a spatial relation info that is to be activated for a CSI-RS resource (e.g., periodic/semi-persistent/aperiodic CSI-RS) for a set of CCs/BWPs (at least for the same band). In response to the TCI state activation command, the UE may activate/apply the TCI state (e.g., spatial relation info) for the CSI-RS resource(s) with the same resource ID for all the BWPs in the indicated CCs. In other words, the UE may activate/apply the spatial relation information for the CSI-RS resource(s), based on the TCI state activation command, for BWPs in the set of CCs. In some cases, the set of CCs may be indicated via RRC signaling received by the UE. In some cases, the UE may determine which list of CCs to apply the TCI state activation command across based on an indication in the DCI or based on a CC in which the DCI is received.

In some cases, the signaling mechanism provided herein may also enable a DCI-based uplink beam update across a plurality of CCs in a CC group. For example, in some cases, the DCI received by the UE may indicate the beam update via a spatial relation or uplink transmission configuration information (TCI) state activation command for at least one of a physical uplink control channel (PUCCH), a physical uplink shared channel (PUSCH), sounding reference signal (SRS), or a physical random access channel (PRACH).

For example, in some cases, the signaling mechanism may enable a DCI-based update for a PUCCH/SRS spatial relation activation command to be applied across a CC group. For example, in some cases, the DCI received by the UE may indicate the beam update via a spatial relation or an uplink TCI state activation command for at least one of PUCCH or SRS. In some cases, the TCI state activation command in the DCI may indicate spatial relation information that is to be activated for a PUCCH or SP/AP SRS resource for a set of CCs/BWPs (at least for the same band). In response to the TCI state activation command, the UE may activate/apply the spatial relation information for the PUCCH or SP/AP SRS resource(s) with the same PUCCH or SRS resource ID for all the BWPs in the indicated CCs. In other words, the UE may activate/apply the spatial relation information for at least one of the PUCCH or the SRS, based on the TCI state activation command, for BWPs in a set of CCs indicated via RRC signaling.

In some cases, the signaling mechanism may enable a DCI based update for a PUCCH/SRS/PUSCH/PRACH UL TCI state activation command to be applied across a CC group. For example, in some cases, the DCI received by the UE may indicate the beam update via a spatial relation or an uplink TCI state activation command for at least one of PUCCH, SRS, PUSCH, or PRACH resource. In some cases, the TCI state activation command in the DCI may indicate an UL TCI state that is to be activated for the PUCCH/SRS/PUSCH/PRACH resource for a set of CCs/BWPs (at least for the same band). In response to the TCI state activation command, the UE may activate/apply the UL TCI state for the PUCCH/SRS/PUSCH/PRACH resource(s) with the same resource ID for all the BWPs in the indicated CCs. In other words, the UE may activate/apply the same set of one or more uplink TCI state IDs for at least one of the PUCCH, SRS, PUSCH, or PRACH resource, based on the TCI state activation command, for BWPs in a set of CCs indicated via RRC signaling.

In some cases, the signaling mechanism provided herein may also enable a DCI-based update for path loss reference signal (PL RS) activation across multiple CCs/BWPs. In some cases, PL RSs may be used, for example, for uplink power control of uplink transmissions, such as SRS, PUCCH, PUSCH, and/or PRACH.

In some cases, the signaling mechanism may enable a DCI based update for an SRS PL RS activation command to be applied across a CC group. For example, in some cases, the DCI received by the UE may indicate the update for the PL RS activation update via a PL RS activation command. In some cases, the PL RS activation command may indicate a PL RS that is to be activated for a SRS resource set for a set of CCs/BWPs (at least for the same band). In response to the TCI state activation command, the UE may apply PL RS to the SRS resource set with the same ID for all the BWPs in the indicated CCs. In other words, the UE may apply the PL RS to at least one SRS resource set, based on the PL RS activation command, for BWPs in a set of CCs indicated via RRC signaling.

In some cases, the signaling may enable a DCI based update for a PUSCH PL RS activation command to be applied across a CC group. For example, in some cases, the DCI received by the UE may indicate the update for the PL RS activation update via a PL RS activation command. In some cases, the PL RS activation command may indicate a PL RS that is to be activated for a sri-PUSCH-PowerControlId by a DCI for a set of CCs/BWPs (at least for the same band). In response to the TCI state activation command, the UE may apply the PL RS to the same sri-PUSCH-PowerControlId for all the BWPs in the indicated CCs. In other words, the UE may apply the PL RS for power control for a PUSCH associated with at least one SRS resource indicator (SRI), based on the PL RS activation command, for BWPs in a set of CCs indicated via RRC signaling.

In some cases, the signaling may enable a DCI based update for a PUCCH (or PUSCH, as described above) PL RS activation command to be applied across a CC group. For example, in some cases, the DCI received by the UE may indicate the update for the PL RS activation update via a PL RS activation command. In some cases, the PL RS activation command may indicate a PL RS that is to be activated for a PUCCH resource by a DCI for a set of CCs/BWPs (at least for the same band). In response to the TCI state activation command, the UE may apply the PL RS to the PUCCH resource with the same ID for all the BWPs in the indicated CCs. In other words, the UE may apply the PL RS to at least one PUCCH resource, based on the PL RS activation command, for BWPs in a set of CCs indicated via RRC signaling.

The signaling mechanism provided herein may also enable a DCI-based update for a (joint) beam and path loss reference signal (PL RS) activation to be applied across a CC group.

In some cases, the DCI (e.g., for the beam/PL RS activation update) can be sent by the network entity from a CC whose cell group (CG) is same as or different from the cell group of any CC (where the DCI is to be applied). For example, the DCI can be sent from a PCell in a master CG to activate beam/PL RS for a group of CCs in secondary CG. In this case, the DCI update may contain the CG ID for which to apply the DCI.

In some cases, for a DCI based beam/PL RS update to be applied across a CC group, the UE may send an acknowledgment/negative acknowledgement (ACK/NACK) for the DCI update. The ACK/NACK can be sent by the UE in uplink control information in PUCCH or PUSCH and, in some cases, may be sent from a same CC where the DCI activation command is received or a different CC. For example, in some cases, the network entity (e.g., gNB) may indicate (to the UE) the CC for sending the ACK/NACK for the DCI activation command (e.g., via RRC/MAC-CE/DCI). In some cases, the ACK/NACK for the DCI update may be sent from the same CC in which the DCI was received.

In some cases, the UE may operate according to a discontinuous reception (DRX) mode in which the UE may periodically go to sleep to save power. In some cases, the UE may receive a WUS to indicate that the UE is to wake up during a next scheduled ON duration to receive information. In some cases, if the UE does not receive a WUS, the UE may skip the next scheduled ON duration and remain asleep. In some cases, a common beam update and/or PL RS update to be applied across multiple CCs may be indicated in wake up signal (WUS). In such cases, the UE may apply the update in one or more subsequent DRX ON duration(s) after receiving the WUS.

In some cases, the UE may report the support of one of more of the various types of DCI-based updates described above. In such cases, the gNB may indicate (to the UE) the enablement of a corresponding DCI-based update operation option (e.g., via RRC, MAC-CE, or DCI). For example, in some cases, the UE may send signaling, to the network entity, indicating a capability of the UE to support the update for at least of a beam or PL RS activation across at least one of a group of CCs or BWPs within the group of CCs. Thereafter, based on the signaled capability of the UE, the UE may receive signaling, from the network entity, indicating enablement of one or more of the updates. In some cases, the signaling indicating the enablement may be provided via at least one of RRC signaling, a MAC CE, or a DCI.

Figure 10:
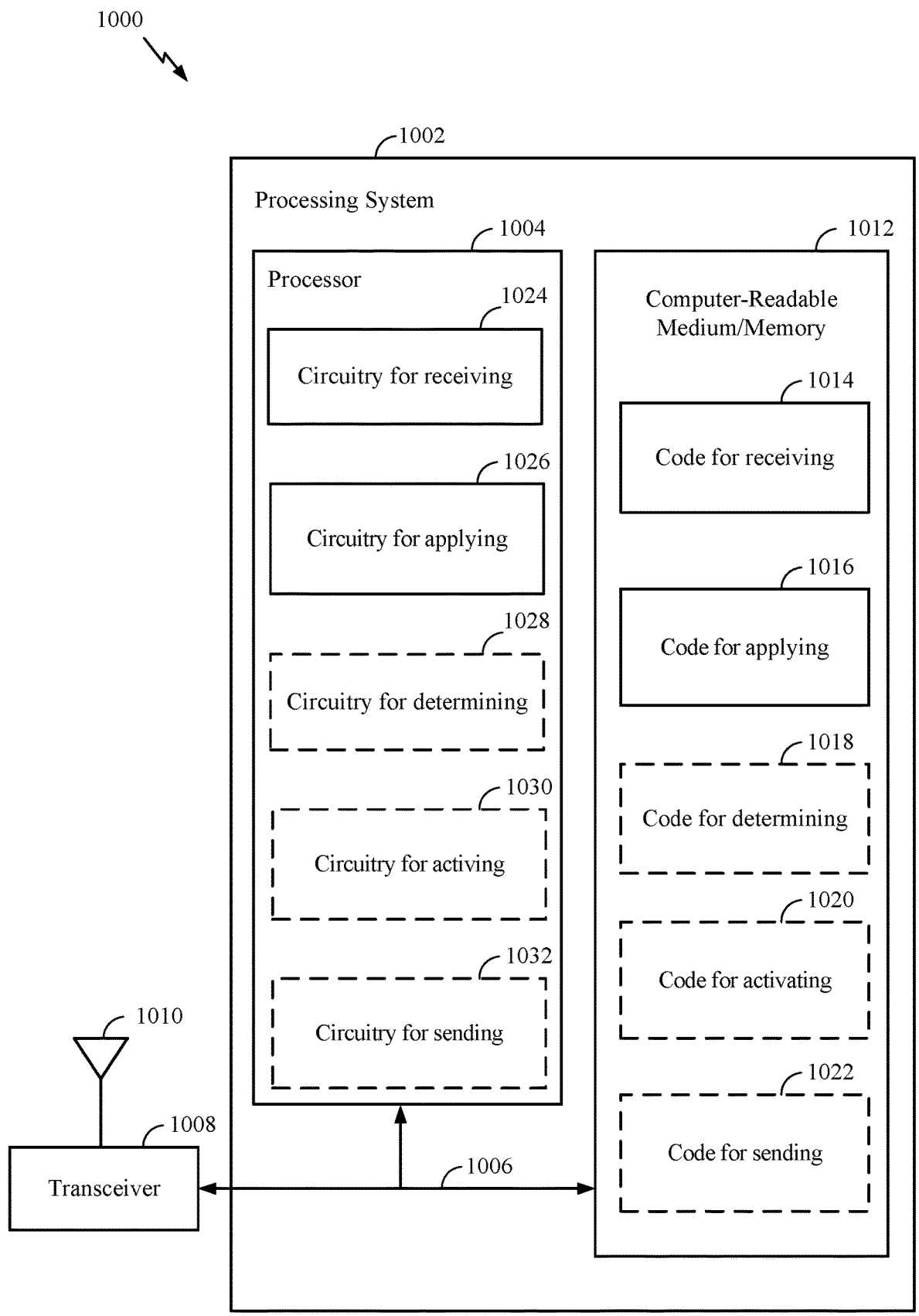
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 8. The communications device 1000 includes a processing system 1002 coupled to a transceiver 1008 (e.g., a transmitter and/or a receiver). The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 8, or other operations for performing the various techniques discussed herein for applying a common beam update across multiple CCs. In certain aspects, computer-readable medium/memory 1012 stores code 1014 for receiving, code 1016 for applying, code 1018 for determining, code 1020 for activating, and code 1022 for sending.

In some cases, code 1014 for receiving may include code for receiving, from a network entity, a downlink control information (DCI) for an update for at least of a beam or path loss (PL) reference signal (RS) activation.

In some cases, code 1016 for applying may include code for applying the update across at least one of a group of component carriers (CCs) or bandwidth parts (BWPs) within the group of CCs.

In some cases, code 1014 for receiving may include code for receiving radio resource control (RRC) signaling of multiple lists of CCs.

In some cases, code 1018 for determining may include code for determining which list of CCs to apply the update across based on an indication in the DCI or based on a CC in which the DCI is received.

In some cases, code 1020 for activating may include code for activating a same set of one or more TCI state IDs for PDSCH, based on a TCI state activation command in the DCI, for BWPs in a set of CCs indicated via radio resource control (RRC) signaling.

In some cases, code 1020 for activating may include code for activating a same set of one or more TCI state IDs for at least one control resource set (CORESET) the UE monitors for PDCCH, based on a TCI state activation command in the DCI, for BWPs in a set of CCs indicated via RRC signaling.

In some cases, code 1020 for activating may include code for activating spatial relation information for at least one CSI-RS resource, based on a TCI state activation command in the DCI, for BWPs in a set of CCs indicated via RRC signaling In some cases, code 1014 for receiving may include code for receiving radio resource control (RRC) signaling of multiple lists of CCs.

In some cases, code 1018 for determining may include code for determining which list of CCs to apply the TCI state activation command across based on an indication in the DCI or based on a CC in which the DCI is received.

In some cases, code 1020 for activating may include code for activating spatial relation information for at least one of PUCCH or SRS, based on a TCI state activation command in the DCI, for BWPs in a set of CCs indicated via radio resource control (RRC) signaling.

In some cases, code 1020 for activating may include code for activating a same set of one or more uplink TCI state IDs for at least one of PUCCH, SRS, PUSCH, or PRACH resource, based on a TCI state activation command in the DCI, for BWPs in a set of CCs indicated via radio resource control (RRC) signaling.

In some cases, code 1016 for applying may include code for applying a PL RS to at least one sounding reference signal (SRS) resource set, based on a PL RS activation command in the DCI, for BWPs in a set of CCs indicated via radio resource control (RRC) signaling.

In some cases, code 1016 for applying may include code for applying a PL RS for power control for a PUSCH associated with at least one sounding reference signal (SRS) resource indicator (SRI), based on a PL RS activation command in the DCI, for BWPs in a set of CCs indicated via RRC signaling.

In some cases, code 1016 for applying may include code for applying a PL RS to at least one PUCCH resource, based on a PL RS activation command in the DCI, for BWPs in a set of CCs indicated via radio resource control (RRC) signaling.

In some cases, code 1022 for sending may include code for sending an acknowledgment of the update, wherein the DCI is received in a first CC and the acknowledgment is sent in a second CC.

In some cases, code 1022 for sending may include code for sending signaling, to the network entity, indicating capability of the UE to support the update for at least of a beam or PL RS activation across at least one of a group of component carriers (CCs) or bandwidth parts (BWPs) within the group of CCs.

In some cases, code 1014 for receiving may include code for receiving signaling, from the network entity, indicating enablement of one or more of the updates, wherein the enablement is signaled via at least one of radio resource control (RRC) signaling, media access control (MAC) control element (CE), or a downlink control information (DCI).

In certain aspects, the processor 1004 includes circuitry configured to implement the code stored in the computer-readable medium/memory 1012. For example, in some cases, the processor 1004 includes circuitry 1024 for receiving, circuitry 1026 for applying, circuitry 1028 for determining, circuitry 1030 for activating, and circuitry 1032 for sending.

In some cases, circuitry 1024 for receiving may include circuitry for receiving, from a network entity, a downlink control information (DCI) for an update for at least of a beam or path loss (PL) reference signal (RS) activation.

In some cases, circuitry 1026 for applying may include circuitry for applying the update across at least one of a group of component carriers (CCs) or bandwidth parts (BWPs) within the group of CCs.

In some cases, circuitry 1024 for receiving may include circuitry for receiving radio resource control (RRC) signaling of multiple lists of CCs.

In some cases, circuitry 1028 for determining may include circuitry for determining which list of CCs to apply the update across based on an indication in the DCI or based on a CC in which the DCI is received.

In some cases, circuitry 1030 for activating may include circuitry for activating a same set of one or more TCI state IDs for PDSCH, based on a TCI state activation command in the DCI, for BWPs in a set of CCs indicated via radio resource control (RRC) signaling.

In some cases, circuitry 1030 for activating may include circuitry for activating a same set of one or more TCI state IDs for at least one control resource set (CORESET) the UE monitors for PDCCH, based on a TCI state activation command in the DCI, for BWPs in a set of CCs indicated via RRC signaling.

In some cases, circuitry 1030 for activating may include circuitry for activating spatial relation information for at least one CSI-RS resource, based on a TCI state activation command in the DCI, for BWPs in a set of CCs indicated via RRC signaling.

In some cases, circuitry 1024 for receiving may include circuitry for receiving radio resource control (RRC) signaling of multiple lists of CCs.

In some cases, circuitry 1028 for determining may include circuitry for determining which list of CCs to apply the TCI state activation command across based on an indication in the DCI or based on a CC in which the DCI is received.

In some cases, circuitry 1030 for activating may include circuitry for activating spatial relation information for at least one of PUCCH or SRS, based on a TCI state activation command in the DCI, for BWPs in a set of CCs indicated via radio resource control (RRC) signaling.

In some cases, circuitry 1030 for activating may include circuitry for activating a same set of one or more uplink TCI state IDs for at least one of PUCCH, SRS, PUSCH, or PRACH resource, based on a TCI state activation command in the DCI, for BWPs in a set of CCs indicated via radio resource control (RRC) signaling.

In some cases, circuitry 1026 for applying may include circuitry for applying a PL RS to at least one sounding reference signal (SRS) resource set, based on a PL RS activation command in the DCI, for BWPs in a set of CCs indicated via radio resource control (RRC) signaling.

In some cases, circuitry 1026 for applying may include circuitry for applying a PL RS for power control for a PUSCH associated with at least one sounding reference signal (SRS) resource indicator (SRI), based on a PL RS activation command in the DCI, for BWPs in a set of CCs indicated via RRC signaling.

In some cases, circuitry 1026 for applying may include circuitry for applying a PL RS to at least one PUCCH resource, based on a PL RS activation command in the DCI, for BWPs in a set of CCs indicated via radio resource control (RRC) signaling.

In some cases, circuitry 1032 for sending may include circuitry for sending an acknowledgment of the update, wherein the DCI is received in a first CC and the acknowledgment is sent in a second CC.

In some cases, circuitry 1032 for sending may include circuitry for sending signaling, to the network entity, indicating capability of the UE to support the update for at least of a beam or PL RS activation across at least one of a group of component carriers (CCs) or bandwidth parts (BWPs) within the group of CCs.

In some cases, circuitry 1024 for receiving may include circuitry for receiving signaling, from the network entity, indicating enablement of one or more of the updates, wherein the enablement is signaled via at least one of radio resource control (RRC) signaling, media access control (MAC) control element (CE), or a downlink control information (DCI).

Figure 11:
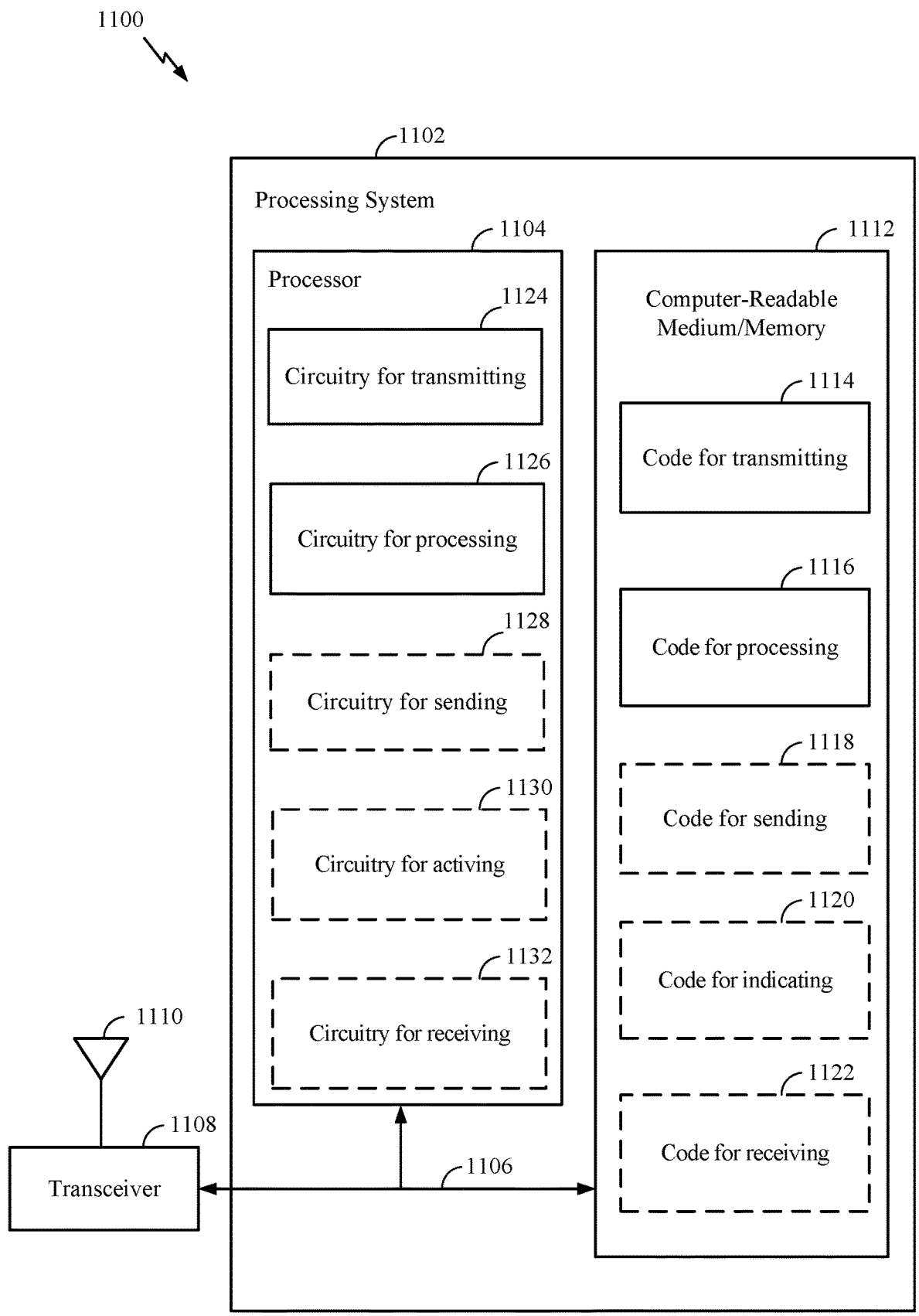
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 9. The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/ memory 1112 is configured to store instructions (e.g., computer-executable code) that when executed by the processor 1104, cause the processor 1104 to perform the operations illustrated in FIG. 9, or other operations for performing the various techniques discussed herein for efficiently signaling a common update for a UE to apply across multiple CCs. In certain aspects, computer-readable medium/memory 1112 stores code 1114 for transmitting, code 1116 for processing, code 1118 for sending, code 1120 for indicating, and code 1122 for receiving.

In some cases, code 1114 for transmitting may include code for transmitting, to a user equipment (UE), a downlink control information (DCI) for an update for at least of a beam or path loss (PL) reference signal (RS) activation.

In some cases, code 1116 for processing may include code for processing transmissions from the UE, based on the UE applying the update across at least one of a group of component carriers (CCs) or bandwidth parts (BWPs) within the group of CCs.

In some cases, code 1118 for sending may include code for sending the UE radio resource control (RRC) signaling of multiple lists of CCs.

In some cases, code 1120 for indicating may include code for indicating which list of CCs to apply the update across via an indication in the DCI or based on a CC in which the DCI is transmitted.

In some cases, code 1114 for transmitting may include code for transmitting radio resource control (RRC) signaling of multiple lists of CCs.

In some cases, code 1120 for indicating may include code for indicating which list of CCs to apply the TCI state activation command across via an indication in the DCI or based on a CC in which the DCI is received.

In some cases, code 1122 for receiving may include code for receiving, from the UE, an acknowledgment of the update, wherein the DCI is transmitted in a first CC and the acknowledgment is received in a second CC.

In some cases, code 1122 for receiving may include code for receiving signaling, from the UE, indicating capability of the UE to support the update for at least of a beam or PL RS activation across at least one of a group of component carriers (CCs) or bandwidth parts (BWPs) within the group of CCs.

In some cases, code 1114 for transmitting may include code for transmitting signaling, to the UE, indicating enablement of one or more of the updates, wherein the enablement is signaled via at least one of radio resource control (RRC) signaling, media access control (MAC) control element (CE), or a downlink control information (DCI).

In certain aspects, the processor 1004 includes circuitry configured to implement the code stored in the computer-readable medium/memory 1012. For example, in some cases, the processor 1004 includes circuitry 1024 for transmitting, circuitry 1026 for processing, circuitry 1028 for sending, circuitry 1030 for indicating, and circuitry 1032 for receiving.

In some cases, circuitry 1124 for transmitting may include circuitry for transmitting, to a user equipment (UE), a downlink control information (DCI) for an update for at least of a beam or path loss (PL) reference signal (RS) activation.

In some cases, circuitry 1126 for processing may include circuitry for processing transmissions from the UE, based on the UE applying the update across at least one of a group of component carriers (CCs) or bandwidth parts (BWPs) within the group of CCs.

In some cases, circuitry 1128 for sending may include circuitry for sending the UE radio resource control (RRC) signaling of multiple lists of CCs.

In some cases, circuitry 1130 for indicating may include circuitry for indicating which list of CCs to apply the update across via an indication in the DCI or based on a CC in which the DCI is transmitted.

In some cases, circuitry 1124 for transmitting may include circuitry for transmitting radio resource control (RRC) signaling of multiple lists of CCs.

In some cases, circuitry 1130 for indicating may include circuitry for indicating which list of CCs to apply the TCI state activation command across via an indication in the DCI or based on a CC in which the DCI is received.

In some cases, circuitry 1132 for receiving may include circuitry for receiving, from the UE, an acknowledgment of the update, wherein the DCI is transmitted in a first CC and the acknowledgment is received in a second CC.

In some cases, circuitry 1132 for receiving may include circuitry for receiving signaling, from the UE, indicating capability of the UE to support the update for at least of a beam or PL RS activation across at least one of a group of component carriers (CCs) or bandwidth parts (BWPs) within the group of CCs.

In some cases, circuitry 1124 for transmitting may include circuitry for transmitting signaling, to the UE, indicating enablement of one or more of the updates, wherein the enablement is signaled via at least one of radio resource control (RRC) signaling, media access control (MAC) control element (CE), or a downlink control information (DCI).

EXAMPLE ASPECTS

Aspect 1: A method for wireless communications by a user equipment (UE), comprising: receiving, from a network entity, a downlink control information (DCI) for an update for at least of a beam or path loss (PL) reference signal (RS) activation and applying the update across at least one of a group of component carriers (CCs) or bandwidth parts (BWPs) within the group of CCs.

Aspect 2: The method of Aspect 1, further comprising: receiving radio resource control (RRC) signaling of multiple lists of CCs and determining which list of CCs to apply the update across based on an indication in the DCI or based on a CC in which the DCI is received.

Aspects 3: The method of Aspect 2, wherein the lists of CCs are non-overlapping.

Aspect 4: The method of any of Aspects 2 or 3, wherein the lists of CCs for at least two of the following are independently configured: uplink transmission configuration information (TCI) state activation across multiple CCs or BWPs; downlink TCI state activation across multiple CCs or BWPs; or spatial information activation across multiple CCs or BWPs.

Aspect 5: The method of any of Aspects 1-4, wherein the DCI indicates the update via a transmission configuration information (TCI) state activation command for at least one of a physical downlink control channel (PDCCH), physical downlink shared channel (PDSCH), or channel state information reference signal (CSI-RS).

Aspect 6: The method of Aspect 5, further comprising at least one of: activating a same set of one or more TCI state IDs for PDSCH, based on the TCI state activation command, for BWPs in a set of CCs indicated via radio resource control (RRC) signaling; activating a same set of one or more TCI state IDs for at least one control resource set (CORESET) the UE monitors for PDCCH, based on the command, for BWPs in a set of CCs indicated via RRC signaling; or activating spatial relation information for at least one CSI-RS resource, based on the command, for BWPs in a set of CCs indicated via RRC signaling.

Aspect 7: The method of any of Aspects 5 or 6, further comprising: receiving radio resource control (RRC) signaling of multiple lists of CCs and determining which list of CCs to apply the TCI state activation command across based on an indication in the DCI or based on a CC in which the DCI is received.

Aspect 8: The method of any of Aspects 1-7, wherein the DCI indicates the update via a spatial relation or uplink transmission configuration information (TCI) state activation command for at least one of a physical uplink control channel (PUCCH), a physical uplink shared channel (PUSCH), sounding reference signal (SRS), or a physical random access channel (PRACH).

Aspect 9: The method of Aspect 8, further comprising at least one of: activating spatial relation information for at least one of PUCCH or SRS, based on the command, for BWPs in a set of CCs indicated via radio resource control (RRC) signaling; or activating a same set of one or more uplink TCI state IDs for at least one of PUCCH, SRS, PUSCH, or PRACH resource, based on the command, for BWPs in a set of CCs indicated via radio resource control (RRC) signaling.

Aspect 10: The method of any of Aspects 1-9, wherein the DCI indicates the update via a PL RS activation command and further comprising at least one of: applying the PL RS to at least one sounding reference signal (SRS) resource set, based on the PL RS activation command, for BWPs in a set of CCs indicated via radio resource control (RRC) signaling; applying the PL RS for power control for a PUSCH associated with at least one sounding reference signal (SRS) resource indicator (SRI), based on the PL RS activation command, for BWPs in a set of CCs indicated via RRC signaling; or applying the PL RS to at least one PUCCH resource, based on the PL RS activation command, for BWPs in a set of CCs indicated via radio resource control (RRC) signaling.

Aspect 11: The method of any of Aspects 1-10, wherein: the DCI is received in a CC of a first cell group (CG), the update is to be applied to CCs of a second CG, and the first and second CGs are different.

Aspect 12: The method of any of Aspects 1-11, further comprising sending an acknowledgment of the update, wherein the DCI is received in a first CC and the acknowledgment is sent in a second CC.

Aspect 13: The method of any of Aspects 1-12, wherein: the update is provided via a wake up signal (WUS) and the UE is configured to apply the update in one or more ON durations after the WUS.

Aspect 14: The method of any of Aspects 1-13, further comprising: sending signaling, to the network entity, indicating capability of the UE to support the update for at least of a beam or PL RS activation across at least one of a group of component carriers (CCs) or bandwidth parts (BWPs) within the group of CCs; and receiving signaling, from the network entity, indicating enablement of one or more of the updates, wherein the enablement is signaled via at least one of radio resource control (RRC) signaling, media access control (MAC) control element (CE), or a downlink control information (DCI).

Aspect 15: A method for wireless communications by a network entity, comprising: transmitting, to a user equipment (UE), a downlink control information (DCI) for an update for at least of a beam or path loss (PL) reference signal (RS) activation and processing transmissions from the UE, based on the UE applying the update across at least one of a group of component carriers (CCs) or bandwidth parts (BWPs) within the group of CCs.

Aspect 16: The method of Aspect 15, further comprising: sending the UE radio resource control (RRC) signaling of multiple lists of CCs and indicating which list of CCs to apply the update across via an indication in the DCI or based on a CC in which the DCI is transmitted.

Aspect 17: The method of Aspect 16, wherein the lists of CCs are non-overlapping.

Aspect 18. The method of any of Aspects 16-17, wherein the lists of CCs for at least two of the following are independently configured: uplink transmission configuration information (TCI) state activation across multiple CCs or BWPs; downlink TCI state activation across multiple CCs or BWPs; or spatial information activation across multiple CCs or BWPs.

Aspect 19: The method of any of Aspects 15-18, wherein the DCI indicates the update via a transmission configuration information (TCI) state activation command for at least one of a physical downlink control channel (PDCCH), physical downlink shared channel (PDSCH), or channel state information reference signal (CSI-RS).

Aspect 20: The method of Aspect 19, wherein at least one of: the TCI state activation command instructs the UE to activate a same set of one or more TCI state IDs for PDSCH for BWPs in a set of CCs indicated via radio resource control (RRC) signaling; the TCI state activation command instructs the UE to activate a same set of one or more TCI state IDs for at least one control resource set (CORESET) the UE monitors for PDCCH for BWPs in a set of CCs indicated via RRC signaling; or the TCI state activation command instructs the UE to activate spatial relation information for at least one CSI-RS resource for BWPs in a set of CCs indicated via RRC signaling.

Aspect 21: The method of any of Aspects 19-20, further comprising: transmitting radio resource control (RRC) signaling of multiple lists of CCs; and indicating which list of CCs to apply the TCI state activation command across via an indication in the DCI or based on a CC in which the DCI is received.

Aspect 22: The method of any of Aspects 15-21, wherein the DCI indicates the update via a spatial relation or uplink transmission configuration information (TCI) state activation command for at least one of a physical uplink control channel (PUCCH), physical uplink shared channel (PUSCH), sounding reference signal (SRS), or physical random access channel (PRACH).

Aspect 23: The method of Aspect 22, wherein at least one of: the TCI state activation command instructs the UE to activate spatial relation information for at least one of PUCCH or SRS for BWPs in a set of CCs indicated via radio resource control (RRC) signaling; or the TCI state activation command instructs the UE to activate a same set of one or more uplink TCI state IDs for at least one of PUCCH, SRS, PUSCH, or PRACH resource for BWPs in a set of CCs indicated via radio resource control (RRC) signaling.

Aspect 24: The method of any of Aspects 15-23, wherein the DCI indicates the update via a PL RS activation command and at least one of: the PL RS activation command instructs the UE to apply the PL RS to at least one sounding reference signal (SRS) resource set for BWPs in a set of CCs indicated via radio resource control (RRC) signaling; the PL RS activation command instructs the UE to apply the PL RS for power control for a PUSCH associated with at least one sounding reference signal (SRS) resource indicator (SRI) for BWPs in a set of CCs indicated via radio resource control (RRC) signaling; or the PL RS activation command instructs the UE to apply the PL RS to at least one PUCCH resource, based on the command, for BWPs in a set of CCs indicated via radio resource control (RRC) signaling.

Aspect 25: The method of any of Aspects 15-24, wherein: the DCI is transmitted in a CC of a first cell group (CG); and the UE is to apply the update to CCs of a second CG; and the first and second CGs are different.

Aspect 26: The method of any of Aspects 15-25, further comprising receiving, from the UE, an acknowledgment of the update, wherein the DCI is transmitted in a first CC and the acknowledgment is received in a second CC.

Aspect 27: The method of any of Aspects 15-26, wherein: the update is provided via a wake up signal (WUS); and the UE is configured to apply the update in one or more ON durations after the WUS.

Aspect 28: The method of any of Aspects 15-27, further comprising: receiving signaling, from the UE, indicating capability of the UE to support the update for at least of a beam or PL RS activation across at least one of a group of component carriers (CCs) or bandwidth parts (BWPs) within the group of CCs; and transmitting signaling, to the UE, indicating enablement of one or more of the updates, wherein the enablement is signaled via at least one of radio resource control (RRC) signaling, media access control (MAC) control element (CE), or a downlink control information (DCI).

ADDITIONAL CONSIDERATIONS

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 8 and/or FIG. 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:
1. A method for wireless communications by a user equipment (UE), comprising:
receiving, from a network entity, a downlink control information (DCI) for an update for at least a beam;
receiving radio resource control (RRC) signaling of multiple lists of component carriers (CCs);
determining which list of CCs to apply the update across based on an indication in the DCI or based on a CC in which the DCI is received; and
applying the update across at least a group of CCs in the determined list of CCs.

2. The method of claim 1, wherein the lists of CCs are non-overlapping.

3. The method of claim 1, wherein the lists of CCs for at least two of the following are independently configured:
uplink transmission configuration information (TCI) state activation across multiple CCs or bandwidth parts;
downlink TCI state activation across multiple CCs or bandwidth parts; or
spatial information activation across multiple CCs or bandwidth parts.

4. The method of claim 1, wherein the DCI indicates the update via a transmission configuration information (TCI) state activation command for at least one of a physical downlink control channel (PDCCH), physical downlink shared channel (PDSCH), or channel state information reference signal (CSI-RS).

5. The method of claim 4, further comprising at least one of:
activating a same set of one or more TCI state IDs for PDSCH, based on the TCI state activation command, for bandwidth parts in a set of CCs indicated via RRC signaling;
activating a same set of one or more TCI state IDs for at least one control resource set (CORESET) the UE monitors for PDCCH, based on the TCI state activation command, for bandwidth parts in a set of CCs indicated via RRC signaling; or
activating spatial relation information for at least one CSI-RS resource, based on the TCI state activation command, for bandwidth parts in a set of CCs indicated via RRC signaling.

6. The method of claim 1, wherein the DCI indicates the update via a spatial relation or uplink transmission configuration information (TCI) state activation command for at least one of a physical uplink control channel (PUCCH), a physical uplink shared channel (PUSCH), sounding reference signal (SRS), or a physical random access channel (PRACH).

7. The method of claim 6, further comprising at least one of:
activating spatial relation information for at least one of PUCCH or SRS, based on the TCI state activation command, for bandwidth parts in a set of CCs indicated via RRC signaling; or
activating a same set of one or more uplink TCI state IDs for at least one of PUCCH, SRS, PUSCH, or PRACH resource, based on the TCI state activation command, for bandwidth parts in a set of CCs indicated via RRC signaling.

8. The method of claim 1, wherein:
the update is further for path loss (PL) reference signal (RS) activation;
the DCI indicates the update for the PL RS activation via a PL RS activation command; and
the method further comprises at least one of:
applying a PL RS to at least one sounding reference signal (SRS) resource set, based on the PL RS activation command, for bandwidth parts in a set of CCs indicated via RRC signaling;

applying a PL RS for power control for a PUSCH associated with at least one sounding reference signal (SRS) resource indicator (SRI), based on the PL RS activation command, for bandwidth parts in a set of CCs indicated via RRC signaling; or applying a PL RS to at least one PUCCH resource, based on the PL RS activation command, for bandwidth parts in a set of CCs indicated via RRC signaling.

9. The method of claim 1, wherein:
the DCI is received in a CC of a first cell group (CG);
the update is to be applied to CCs of a second CG; and
the first and second CGs are different.

10. The method of claim 1, further comprising sending an acknowledgment of the update, wherein the DCI is received in a first CC and the acknowledgment is sent in a second CC.

11. The method of claim 1, wherein:
the update is provided via a wake up signal (WUS); and
the UE is configured to apply the update in one or more ON durations after the WUS.

12. The method of claim 1, further comprising:
sending signaling, to the network entity, indicating capability of the UE to support the update for the at least of the beam or PL RS activation; and
receiving signaling, from the network entity, indicating enablement of the update for the at least of the beam or the PL RS activation, wherein the enablement is signaled via at least one of RRC signaling, media access control (MAC) control element (CE), or the DCI or another DCI.

13. The method of claim 1, further comprising applying the update across bandwidth parts (BWPs) within the group of CCs.

14. A method for wireless communications by a network entity, comprising:
transmitting, to a user equipment (UE), a downlink control information (DCI) for an update for at least a beam;
sending the UE radio resource control (RRC) signaling of multiple lists of component carriers (CCs);
indicating which list of CCs to apply the update across via an indication in the DCI or based on a CC in which the DCI is transmitted; and
processing transmissions from the UE, based on the update applied across at least one of a group of CCs in the indicated list of CCs.

15. The method of claim 14, wherein the lists of CCs are non-overlapping.

16. The method of claim 14, wherein the lists of CCs for at least two of the following are independently configured:
uplink transmission configuration information (TCI) state activation across multiple CCs or bandwidth parts;
downlink TCI state activation across multiple CCs or bandwidth parts; or
spatial information activation across multiple CCs or bandwidth parts.

17. The method of claim 14, wherein the DCI indicates the update via a transmission configuration information (TCI) state activation command for at least one of a physical downlink control channel (PDCCH), physical downlink shared channel (PDSCH), or channel state information reference signal (CSI-RS).

18. The method of claim 17, wherein at least one of:
the TCI state activation command instructs the UE to activate a same set of one or more TCI state IDs for PDSCH for bandwidth parts in a set of CCs indicated via RRC signaling;
the TCI state activation command instructs the UE to activate a same set of one or more TCI state IDs for at least one control resource set (CORESET) the UE monitors for PDCCH for bandwidth parts in a set of CCs indicated via RRC signaling; or
the TCI state activation command instructs the UE to activate spatial relation information for at least one CSI-RS resource for bandwidth parts in a set of CCs indicated via RRC signaling.

19. The method of claim 14, wherein the DCI indicates the update via a spatial relation or uplink transmission configuration information (TCI) state activation command for at least one of a physical uplink control channel (PUCCH), physical uplink shared channel (PUSCH), sounding reference signal (SRS), or physical random access channel (PRACH).

20. The method of claim 19, wherein at least one of:
the TCI state activation command instructs the UE to activate spatial relation information for at least one of PUCCH or SRS for bandwidth parts in a set of CCs indicated via RRC signaling; or
the TCI state activation command instructs the UE to activate a same set of one or more uplink TCI state IDs for at least one of PUCCH, SRS, PUSCH, or PRACH resource for bandwidth parts in a set of CCs indicated via RRC signaling.

21. The method of claim 14, wherein:
the update is further for path loss (PL) reference signal (RS) activation;
the DCI indicates the update for the PL RS activation via a PL RS activation command; and
at least one of:
the PL RS activation command instructs the UE to apply a PL RS to at least one sounding reference signal (SRS) resource set for bandwidth parts in a set of CCs indicated via RRC signaling;
the PL RS activation command instructs the UE to apply a PL RS for power control for a PUSCH associated with at least one sounding reference signal (SRS) resource indicator (SRI) for bandwidth parts in a set of CCs indicated via RRC signaling; or
the PL RS activation command instructs the UE to apply a PL RS to at least one PUCCH resource for bandwidth parts in a set of CCs indicated via RRC signaling.

22. The method of claim 14, wherein:
the DCI is transmitted in a CC of a first cell group (CG); and
the UE is to apply the update to CCs of a second CG; and
the first and second CGs are different.

23. The method of claim 14, further comprising receiving, from the UE, an acknowledgment of the update, wherein the DCI is transmitted in a first CC and the acknowledgment is received in a second CC.

24. The method of claim 14, wherein:
the update is provided via a wake up signal (WUS); and
the UE is configured to apply the update in one or more ON durations after the WUS.

25. The method of claim 14, further comprising:
receiving signaling, from the UE, indicating capability of the UE to support the update for the at least of the beam or PL RS activation; and transmitting signaling, to the UE, indicating enablement of the update for the at least of the beam or the PL RS activation, wherein the enablement is signaled via at least one of RRC signaling, media access control (MAC) control element (CE), or the DCI or another DCI.

26. The method of claim 14, further comprising processing the transmissions from the UE, based on the update applied across bandwidth parts (BWPs) within the group of CCs.

27. An apparatus for wireless communications by a user equipment (UE), comprising:
at least one processor configured to:
receive, from a network entity, a downlink control information (DCI) for an update for at least a beam;
receive radio resource control (RRC) signaling of multiple lists of component carriers (CCs);
determine which list of CCs to apply the update across based on an indication in the DCI or based on a CC in which the DCI is received; and
apply the update across at least one of a group of CCs in the determined list of CCs; and
a memory coupled with the at least one processor.

28. The apparatus of claim 27, wherein the at least one processor is further configured to apply the update across bandwidth parts (BWPs) within the group of CCs.

29. An apparatus for wireless communications by a network entity, comprising:
at least one processor configured to:
transmit, to a user equipment (UE), a downlink control information (DCI) for an update for at least a beam; and
send the UE radio resource control (RRC) signaling of multiple lists of component carriers (CCs);
indicate which list of CCs to apply the update across via an indication in the DCI or based on a CC in which the DCI is transmitted; and
process transmissions from the UE, based on the update applied across at least one of a group of CCs in the indicated list of CCs; and
a memory coupled with the at least one processor.

30. The apparatus of claim 29, wherein the at least one processor is further configured to process the transmissions from the UE, based on the update applied across bandwidth parts (BWPs) within the group of CCs.

31. A method for wireless communications by a user equipment (UE), comprising:
receiving, from a network entity, a downlink control information (DCI) for an update for at least a beam, wherein the DCI indicates the update via a transmission configuration information (TCI) state activation command for at least one of a physical downlink control channel (PDCCH), physical downlink shared channel (PDSCH), or channel state information reference signal (CSI-RS); and
applying the update across at least one of a group of component carriers (CCs).

32. The method of claim 31, further comprising:
receiving via radio resource control (RRC) signaling of multiple lists of CCs; and
determining which list of CCs to apply the TCI state activation command across based on an indication in the DCI or based on a CC in which the DCI is received.

33. A method for wireless communications by a user equipment (UE), comprising:
receiving, from a network entity, a downlink control information (DCI) for an update for at least a beam, wherein the DCI indicates the update via a spatial relation or uplink transmission configuration information (TCI) state activation command for at least one of a physical uplink control channel (PUCCH), a physical uplink shared channel (PUSCH), sounding reference signal (SRS), or a physical random access channel (PRACH); and
applying the update across at least one of a group of component carriers (CCs).

34. A method for wireless communications by a network entity, comprising:
transmitting, to a user equipment (UE), a downlink control information (DCI) for an update for at least a beam, wherein the DCI indicates the update via a transmission configuration information (TCI) state activation command for at least one of a physical downlink control channel (PDCCH), physical downlink shared channel (PDSCH), or channel state information reference signal (CSI-RS); and
processing transmissions from the UE, based on the update applied across at least one of a group of component carriers (CCs).

35. A method for wireless communications by a network entity, comprising:
transmitting, to a user equipment (UE), a downlink control information (DCI) for an update for at least a beam, wherein the DCI indicates the update via a spatial relation or uplink transmission configuration information (TCI) state activation command for at least one of a physical uplink control channel (PUCCH), physical uplink shared channel (PUSCH), sounding reference signal (SRS), or physical random access channel (PRACH); and
processing transmissions from the UE, based on the update applied across at least one of a group of component carriers (CCs).

36. The method of claim 35, further comprising:
transmitting radio resource control (RRC) signaling of multiple lists of CCs; and
indicating which list of CCs to apply the TCI state activation command across via an indication in the DCI or based on a CC in which the DCI is received.

* * * * *